Inventor:
Benjamin Mosier
By Hofgren, Wegner,
Allen, Stellman & McCord
Attys

United States Patent Office 3,671,333
Patented June 20, 1972

---

3,671,333
COATED REFLECTIVE SURFACE AND METHOD OF MAKING SAME
Benjamin Mosier, Houston, Tex., assignor to Esquire, Inc.
Filed June 9, 1969, Ser. No. 831,617
Int. Cl. C23f 7/06
U.S. Cl. 148—6.27                                 25 Claims

ABSTRACT OF THE DISCLOSURE

Reflective aluminum surface for high powered fixtures are improved by applying a natural or synthetic hydrophilic colloid to the surface. Usually the colloid is applied during anodizing of the aluminum surface. In one form the colloid is tanned or cross-linked to provide a more durable coating. In an especially preferred embodiment, the colloid and tanning agent are both present in the anodizing bath so that the colloid forms a collidate and is tanned during anodizing. In any event, the colloid is chemically absorbed (chemisorbed) and/or electrolitically deposited on the surface. The coatings are much thinner, e.g. $1/10$ to $1/5$ the thickness of normal anodized coatings.

BACKGROUND OF THE INVENTION

Field of the invention

This invention relates to improvements in reflective surfaces for aluminum reflectors used in high powered fixtures

Statement of the prior art

Large fixtures having aluminum reflectors are conventionally used for industrial lighting, lighting football stadiums, shopping centers and the like. Usually these reflector surfaces are of anodized aluminum and are enclosed in the fixture for reflecting light through a glass pane or cover. The fixtures can generate internal temperatures of up to 500° F. or higher and these temperatures, combined with the light, often cause photo-degradation of the aluminum surfaces and ultimately reduce photo-specularity during use of the fixture.

The "reflectivity" of a reflector is the ratio of total light reflected from a surface to the total light falling upon it and is a definition of the efficiency of a surface in reflecting radiant energy. The "brightness" of a surface is the reflectivity of the surface relative to illumination of the surface. Where the illumination is the same, the brightness of two surfaces are proportional to reflectivity. The "specular reflectance" or specularity of a surface defines the proportion of light for which the angle of incidence is equal to the angle of reflectance while "diffuse reflectance" identifies the light which diffuses or reflects at a different angle, usually in all angles or directions. The percent specularity is calculated by subtracting the percent diffuse reflectance from the percent total reflectance and then dividing by percent total reflectance.

Pure aluminum has excellent reflectivity ranging from 97% at 10 microns to 90% to 95% at one micron in the infrared range and dropping to about 90% through the visible range although in the visible to infrared transition reflectivity decreases to about 87%. In the ultraviolet range, the reflectivity of pure aluminum drops to 85% down at about .2 micron wavelength. When pure aluminum is coated with an oxide by anodizing, the reflectivity in the visible range drops by 5% to 10%, increases to above 90% at about 1.2 microns and then decreases to about 30% at 10 microns. Reflectivity in the ultraviolet range drops off much more quickly and is below 60% at .25 micron. Thus, anodizing of aluminum surfaces results in a marked decrease in the natural reflectivity of pure aluminum.

SUMMARY OF THE INVENTION

According to the present invention, a hydrophilic colloid coating is applied to a reflective surface to protect the surfaces from deterioration through photo-degradation, weathering and other sources. The coating improves specularity and does not materially decrease reflectivity. The present invention is especially useful for coating reflective aluminum surfaces to provide a protective, non-oxidizing, heat resistant highly reflective surface.

While this invention is susceptible of embodiment in many different forms, there will be described herein with reference to the drawings perfect embodiments of the invention with the understanding that the present disclosure is to be considered as an exemplification of the principles of the invention is not intended to limit the invention to the embodiments disclosed.

One form of the present invention is especially preferred because it produces a thin very hard, durable and abrasion resistant surface coating. To obtain such a coating, the hydrophilic colloid is applied to the surface and is tanned on the surface during anodizing. This is done by including both the colloid and hardening or tanning agent in the anodizing bath during anodizing of the aluminum surface.

In another form of the present invention, the coating is applied to an anodized aluminum surface and then is tanned or cross-linked by a tanning agent. In still another form of the invention, the coating step is carried out so that the colloid coating material is present during anodizing of the aluminum surface to electrolytically absorb the coating material on the surface. These forms of the invention produce thin durable coatings but they are not abrasion resistant as are those produced by the especially preferred procedure.

The surface coatings produced by the present invention are much thinner and apparently more compact than previous anodized aluminum coatings or surfaces. This is believed to be due to the larger molecule of the colloid forming as a colloidate on the reflective surface which apparently compacts the aluminum oxide formed. Theoretically, the same amount of aluminum oxide should form whether or not the colloid is present in the anodizing bath so densification or compacting of the aluminum oxide appears to be the reasonable answer. The coatings provide the advantages of a thinner coating, e.g., better reflectivity, while eliminating the disadvantages of a thin normally anodized coating, e.g., lower wear resistance and shorter life.

BRIEF DESCRIPTION OF THE PREFERRED EMBODIMENTS

Figure 1:
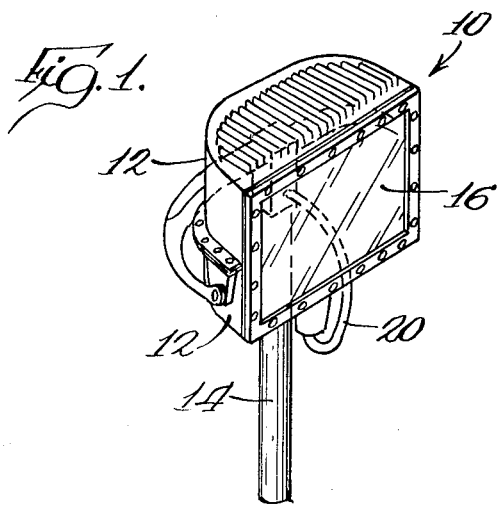
FIG. 1 is a perspective view of a high powered fixture having a coated surface prepared in accordance with this invention.
Figure 2:
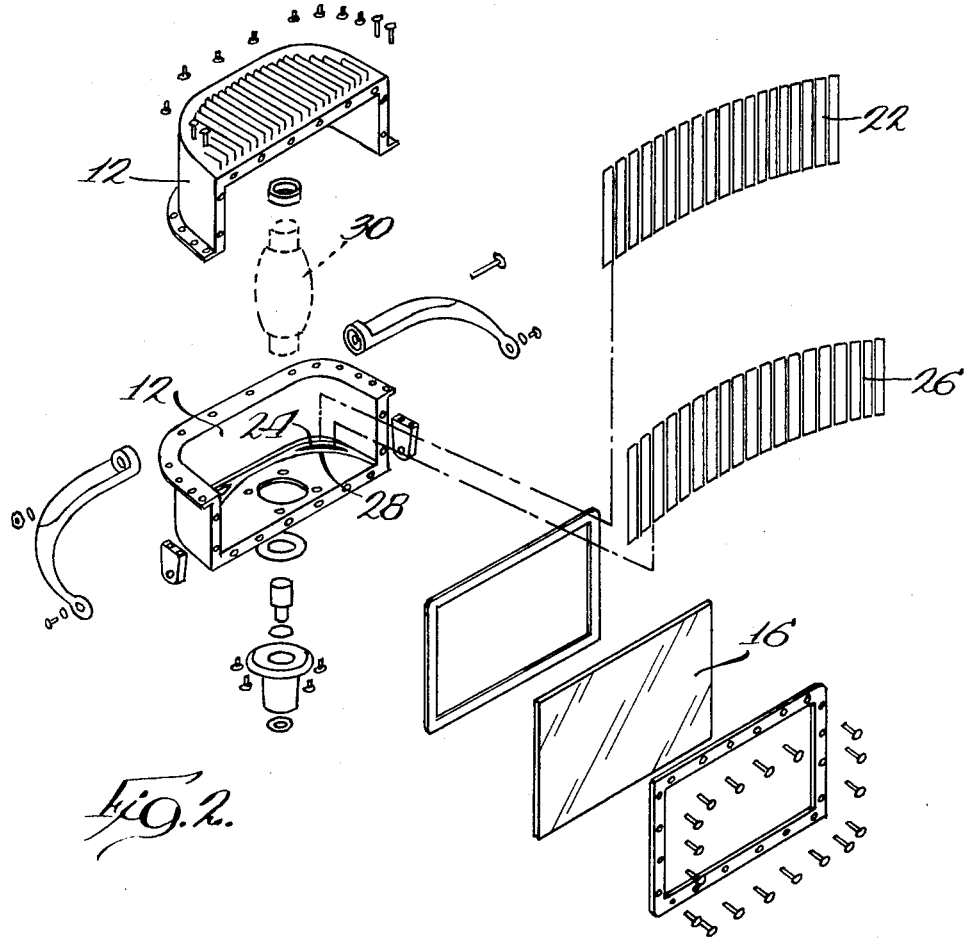
FIG. 2 is an enlarged view showing the fixture of FIG. 1 exploded.

Turning first to FIGS. 1 and 2, there is illustrated a lamp 10 including a two-piece housing 12 assembled by suitable screws and supported on a suitable pole or standard 14. A glass 16 is secured across the fixture opening by a gasket, frame and a plurality of screws. Power is supplied from a suitable electric power source via a power line 20.

As best seen in FIG. 2, the illustrated fixture can utilize either of two types of reflector systems, an "A" reflector 22 or a "B" reflector 26, which are received in grooves 24 and 28, respectively, in the fixture. Each of the reflectors comprises a plurality of parallel upstanding aluminum reflector strips with reflector 26 being of slightly greater width than reflector 22. A light source or lamp is indicated in phantom at 30.

The present invention deals with the improving of reflectivity or percent specularity of reflectors such as reflectors 22 and 26 which are used in high powered fixtures. This can be accomplished generally by coating the reflector with a hydrophilic colloid and then tanning the colloid. Alternatively, the colloid coating can be applied before or during anodizing.

Figure 3:
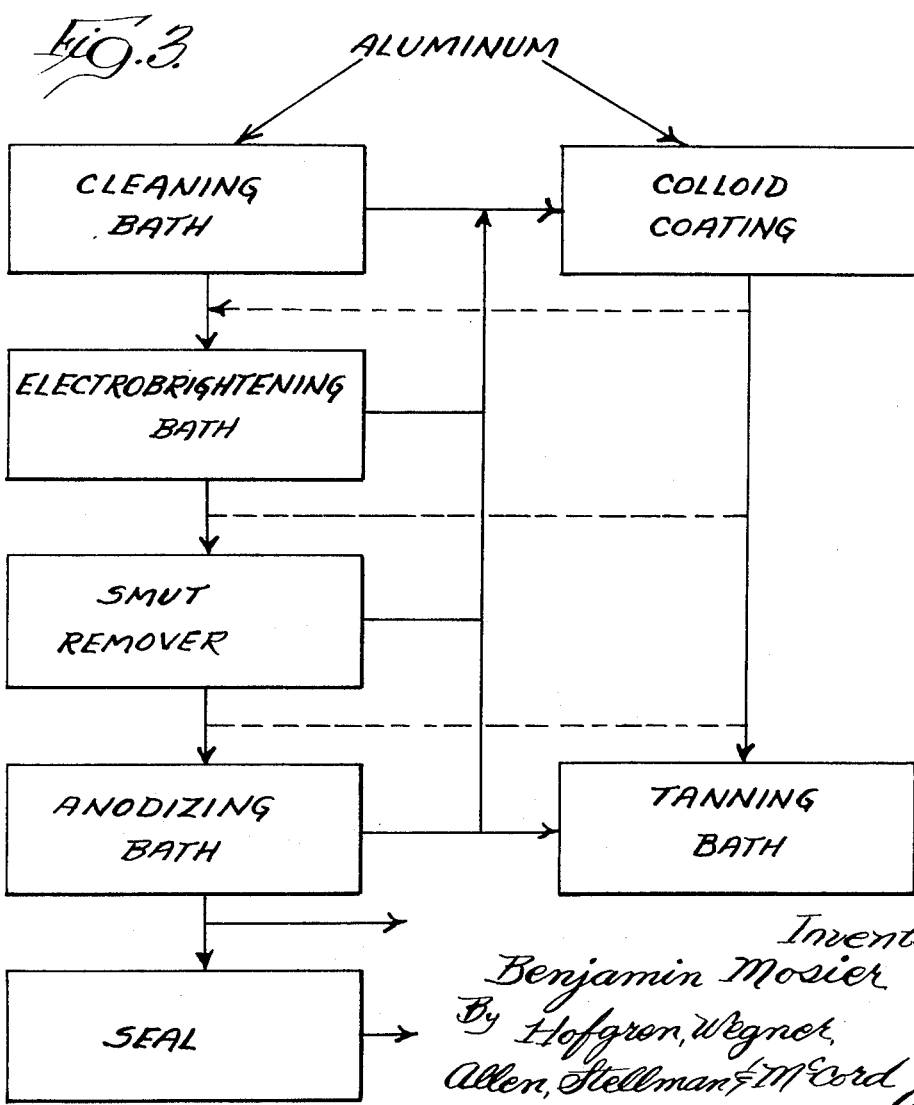
FIG. 3 is a flow scheme which can be followed in carrying out some embodiments of the method of this invention.

Referring to FIG. 3, there is a flow scheme which illustrates some of the embodiments of the method of the invention. According to one form of the method, aluminum can be coated with the colloid in a colloid coating bath, permitted to dry and then tanned in a separate tanning bath.

In another form of the method, the aluminum can be subjected to an anodizing process, e.g. by immersing the aluminum seriatim in a cleaning bath, an electrobrightening bath, a smut remover solution and then an anodizing bath. It is also conventional to subject the anodized surface to a sealing operation as indicated in FIG. 3 after it is removed from the anodizing bath. The cleaning, electrobrightening and smut remover baths are optional, although very desirable. In this form of the invention, the colloid coating can be present in any of the electrobrightening, smut remover or anodizing baths.

Alternatively, the aluminum can be coated in the colloid coating bath and thereafter delivered as indicated by the dotted lines to either the electrobrightening bath, the smut remover or the anodizing bath.

In still another form, the aluminum can be simply anodized by normal anodizing procedures and directed from the anodizing bath to a colloid coating bath, thence to the tanning bath.

Still referring to FIG. 3, the especially preferred procedure for producing extremely hard surface coatings is to run the aluminum through the anodizing procedure on the left-hand side of FIG. 3, including the rinse, electrobrightening, de-smutting and anodizing steps seriatim, with the colloid and tanning agent both present in the anodizing bath. Usually, .001 to 1 and preferably about .01 to .05% by weight of tanning agent will be used in the anodizing bath. Tanning agents usually have a high charge and preferably has the same charge, i.e., positive or negative, as the colloid when both colloid and tanning agent are present in the anodizing bath. One tanning agent which has been found to produce an extremely hard finish is potassium dichromate.

The colloidal coating compositions are liquid, i.e., non-gelled solutions of water-dispersible hydrophilic colloids, usually containing at least .001 and possibly up to 5 or 10% by weight, depending on the colloid used, but more often .01 to 2% and preferably .1 to 1% of the hydrophilic material in a suitable volatile liquid solvent such as water, alcohol (e.g., methylethyl or butyl), ketones (e.g., acetone, methylethyl ketone, and 1.4-dioxane) and other high dielectric constant polar solvents, having such polar groups as carboxyl, amino, hydroxy, and nitrile groups, such as acetonitrile, foramide, dimethylacetamide and tetrahydrofuran. The preferred solvent is water or water containing other water miscible solvents. Where a mixture of water and other solvent is used with colloid in the anodizing solution, such other solvent should be non-reactive toward the acid present. The colloid solution is a true solution of the colloid in a solvent although an excess of colloid may be used above the solubility point so long as such excess is insufficient to gel the solution at normal use temperatures. As a guide, 3% polyvinyl chloride or 1% gelatin may gell an aqueous solution of 70° F. but at higher temperatures, e.g., in the anodizing bath, higher concentrations can usually be used without gelling. The pH and concentration of the solution are maintained at proper levels to prevent the colloid from approaching its isoelectric point at which particles will agglomerate (coacerate). Accordingly, the concentration of the solution should be below the cloudy region or region of coacervation or coagglomeration.

Examples of useful hydrophilic colloids are the water soluble natural and synthetic resins, including gums. The colloids are hydrophilic because they contain substantial amounts of water-loving polar components such as carboxyl groups, amino groups, hydroxyl groups, ether groups, metal complexes, and like components, rendering them water soluble or dispersible. Suitable natural resins are gum arabic, agar, guar gum, gum karaya, gum yacca, damar, casein, and resinous derivatives of natural materials such as casein derivatives, aldehyde starch and other starch derivatives, sodium carrageenin, sodium alginate and other alginates, etc. Suitable synthetic resins include the water soluble or dispersible sodium and other alkali salts of acrylic acid and acrylamide polymers such as sodium polyacrylate and sodium polyacrylamide, and water soluble or dispersible forms of polyvinylpyrollidone, polyvinylethers, polyvinylacetate and copolymers of vinylacetate such as vinylacetate-ethylene copolymers, methylcellulose, cellulose acetate-phthalate, carboxypolmethylene, etc.

Gelatins, which are collagen-type materials are especially preferred hydrophilic colloids. Gelatins or collagens and other useful hydrophilic colloids possess or can receive either a positive charge or a negative charge at neutrality. Gelatins, being amino acids, are either acid precursors or alkaline precursors and altering the pH of their environment, e.g., in an electrolyte, can change their surface charge. For example, a gelatin having a positive charge at neutrality would migrate to the negative electrode or cathode in an electrolyte. However, the same gelatin will have its charge reversed in a more acid or lower pH electrolyte such as an anodizing bath, so that it would migrate to the anode, i.e., the aluminum surface being anodized. The pH of the bath can be adjusted to a lower level if needed to deposit a particular colloid, especially a more highly alkaline colloid. The gelatin codeposits with the aluminum oxide, apparently forming aluminum oxide-gelatinate. Other colloids form similar complexes or aluminum oxide-colloidates. Where a negative charge or acid precursor gelatin is used, the acid pH of the bath permits it to retain its negative charge.

The tanning operation creates cross-linking in the coating and improved its properties. Particularly, tanning increases the hardness of the coating and renders the hydrophilic coating insoluble and non-swelling in water to improve weather resistance without adversely affecting reflectivity of the surface. Although colloid coatings which have been subjected to anodizing conditions, and particularly those colloid coatings which are deposited during anodizing to form aluminum oxide complexes, are already relatively water insoluble and hardened, such coatings can also be further tanned by application of a hardening solution if desired. Preferably, however, the tanning operation is carried out along with the coating operation in the anodizing bath.

The tanning or hardening agents are those materials capable of cross-linking or complexing or causing cross-linking or complexing of the hydrophilic colloid functional groups, usually amine, carboxyl, ester, and/or hydroxyl groups, or highly charged metal ions such as chrom alum (chromium potassium sulfate). For example, gelatines can be hardened by dipping in a bath or aqueous solution of formaldehyde or other aldehyde, or the like. Usually a concentration .5 to 5% of hardening agent in the solution or bath is sufficient although concentrations from .001 to 50% or more, up to 100% with liquid hardening agents can be used depending on the solubility of the particular hardening agent. For hardening gelatin coatings, an aqueous solution of 2% chrom alum has been found to be effective. When the hardening agent is included in the anodizying bath, an amount in the range of .001 to 5 weight percent is preferred.

Examples of other useful hardening agents are polyvinyl alcohol, boric acid, polyurea and other urethane precursors, aluminum sulfate, dimethylol urea, hexamethylenetetramine, chromic acid and aldehyde donors such as formaldehyde, gluteraldehyde, glyoxal and the like. The choice of tanning agent will depend on the colloid used for coating because the tanning agent should have free reactive groups for reacting with or causing reaction of free groups of the colloid.

A typical anodizing procedure, referred to herein as "Anodizing Process" is as follows:

Step No.:   Procedure
1____ Mill sheet aluminum is cleaned by immersing in alkaline cleaner (NaOH solution) at about 160° F., for 3 minutes and then rinsed in tap water for 30 seconds.
2____ The cleaned aluminum is given a 5 minute dip in an electrobrightening both (fluoborate bath) and then rinsed for 30 seconds in tap water.
3____ The aluminum is then immersed for 2 minutes in a smut remover (an acid cleaner) to desmut, followed by a 30 second rinse in tap water.
4____ The de-smutted aluminum is anodized in an anodizing bath, preferably at about 80 to 100° F., containing 15% $H_2SO_4$ for 10 minutes followed by a 30 second rinse in tap water, neutralized in sodium hydroxide solution for 30 seconds, and then another 30 second rinse.
5____ The anodyzed aluminum is then dipped in a neutral hot water sealing bath at about 208° F. for about 10 minutes.

The basic specific baths and solutions used in the above Anodizing Process were as follows:

Alkaline cleaner: A solution containing 7.5 oz. sodium hydroxide and 6 oz. of sodium fluoride per gallon of water.

Electrobrightening bath: Aqueous solution of about 0.25 normal fluoboric acid, maintained at 0.15 to 0.18 normal during use. An intitial current density of about 10 to 12 amperes per sq. ft. is usually sufficient, increasing to 20 amperes per sq. ft. for an old solution. The maximum potential for an old solution is about 40 volts.

Smut remover: Three and one-half pints of 75% $H_3PO_4$ and one and three quarters pounds of chromic acid in 10 gallons of water maintained at a temperature of about 180–190° F.

Anodizing bath: A 15% by weight sulfuric acid electrolyte maintained at 68 to 74° F. under continuous agitation. A current density of 10 to 12 amperes per sq. ft. (usually a potential of 15–22 volts) is applied and maintained throughout the anodizing step.

The colloid can be added to any of the above baths and preferably both the colloid and tanning agent are added to the anodizing bath.

As in other anodizing processes, the thickness of the oxide film can be varied by varying the length of the anodizing step and/or potential applied to the anodizing bath. Usually, longer anodizing procedures and higher current densities result in thicker coatings. By varying anodizing time and potential only within narrow confines, coating thicknesses ranging from .02 mil up to 0.2 mil and thicker were produced.

After anodizing and rinsing, aluminum surfaces are conventionally subjected to a sealing procedure. One common sealing procedure is the hot water seal where the aluminum is immersed in water at or above about 200° F. Usually, the pH of the sealing water is maintained between 5.5 and 6.5, can be by adjustment with sulphuric acid or sodium hydroxide. Preferably, a small amount of wetting agent, e.g., .001 to .005 percent is included in the sealing water to permit proper draining of the aluminum or removal from the sealing bath. Small amounts of other additives can be used as is customary. Alternatively, a phosphate seal can be used involving the treatment of the surface in a solution containing about 2% potassium dihydrogen phosphate ($KH_2PO_4$) and 0.02% chromic acid at about 170° to 180° F.

The present anodizing process can be revised as desired to conform to any normal plant operation. Information on various alternative procedures for use in anodizing processes is available in patents and publications of the Aluminum Company of America relating to the Alcoa "Alzak" process.

EXAMPLES OF COATING COMPOSITIONS

The following coating compositions A through H and J through T were prepared by mixing the ingredients indicated.

Composition:   Ingredients
A ____ 0.3% sodium polyacrylamide (Cygard RC–294) in water.
B ____ 0.3% sodium polyacrylate (Acrysol G–110) in water.
C ____ 0.3% sodium alginate (Protonal LF) in water.
D ____ 0.3% polyvinylacetate (Elvacet) in water.
E ____ 0.3% Gelatin A (a so-called alkaline precursor gelatin which possesses a positive charge) in water.
F ____ 0.3% alginate (Kelgin XL) in water.
G ____ 0.3% water extendable hydroxyethylcellulose having a molecular weight of about 4400 (Cellosize WP–4400) in n-heptane.
H ____ 0.3% water extendable hydroxyethylcellulose having a molecular weight of about 300 (Cellosize WP–300) in water.
J ____ 0.5% gum karaya in 99% isopropanol.
K ____ 0.3% gum tragacanth in water.
L ____ 0.3% polyvinylpyrollidone in water.
M ____ 0.3% polyvinylether (Gantrez AN–139) in water.
N ____ 0.3% sodium carrageenin (a polysaccharide gum) in water.
O ____ 0.3% gelatin B (a gelatin having a negative charge) in water.
P ____ 0.3% sodium carboxymethyl-cellulose (Carbose M) in water.
Q ____ 0.3% carboxypolymethylene (Carbopol 940) in water.
R ____ 0.3% agar in water.
S ____ 0.3% gum arabic in water.
T ____ 0.3% guar gum in water.

EXAMPLES 1–25

Aluminum coupons were dipped in the above compositions after various steps in the anodizing process described above to study the effect of application of the coating at different stages of the process. Usually, the total reflectance (TR) and diffuse reflectance (DR) values were better when the coating was applied to prior to or during the anodizing step (Step #4). The Step No. column in Table I identifies the last step of the anodizing process which had been completed prior to dipping in the hydrophilic colloid composition. Representative percent TR and percent DR values are reported in Table I for the visible light range.

TABLE I

| Example composition | Step No. | Visible region, percent | |
|---|---|---|---|
| | | TR | DR |
| A | 2 | 88.0 | 3.3 |
| A | 4 | 85.1 | 3.0 |
| A | 2 | 87.0 | 3.0 |
| A | 3 | 89.0 | 1.8 |
| A | 4 | 84.0 | 3.3 |
| B | 2 | 87.6 | 3.0 |
| B | 2 | 80.0 | 3.0 |
| B | 3 | 90.2 | 2.0 |
| B | 4 | 84.3 | 3.5 |
| E | 2 | 88.2 | 5.0 |
| E | 2 | 89.5 | 2.5 |
| M | 1 | 87.9 | 2.6 |
| M | 4 | 84.1 | 3.5 |
| N | 2 | 86.6 | 2.9 |
| N | 4 | 84.0 | 4.2 |
| O | 4 | 84.1 | 3.8 |
| P | 2 | 86.6 | 2.9 |
| P | 3 | 84.0 | 3.3 |
| P | 4 | 89.0 | 4.5 |
| S | 1 0 | 91.0 | 5.1 |
| S | 2 | 86.7 | 3.4 |
| S | 3 | 91.7 | 2.2 |
| S | 4 | | 4.2 |
| T | 2 | 88.2 | 3.7 |
| T | 4 | 85.0 | 4.2 |

1 0 indicates that the dip was before Step 1.

The inclusion of the hydrophilic colloid in the anodized coating decreases the diffuse reflectance values in the visible light region, which of course improves the percent specularity. Even with ordinary anodized coatings in the absence of hydrophilic colloid the thinner coatings seem to have a lower diffuse reflectance value but such thin coatings from ordinary anodizing processes are not recommended because they apparently do not stand up well enough under some use conditions. For example, commercial anodized aluminum usually has an anodized coating thickness (CT) between .15 and .25 mil, while it is not unusual to obtain coatings by the present method which have thicknesses below .03 mil and which are sufficiently hard to stand up under extended periods of use. It is believed that the thinness of the present coatings is a prime factor contributing to the low diffuse reflectance values.

EXAMPLES 26–37

These 12 examples illustrate the use of varying concentrations of hydrophilic colloids and also illustrate the effect of the de-smutting step. In each of these examples, an aluminum coupon was cleaned in alkaline cleaner by immersing for three minutes with the cleaner at a temperature of 150° F. The samples were then electrobrightened in a 4% fluoroboric acid solution for 5 minutes at a temperature of 85° for Examples 26 through 31 and 80° for Examples 32 through 37 with an applied potential of 14 volts. The hydrophilic colloid identified in the table below was included in the electrobrightening solution in the amount indicated. After electrobrightening, Examples 26, 28, 30, 32, 34 and 36 were de-smutted by immersing for 2 minutes in the de-smutting bath at a temperature of 180° F. The remaining examples were not de-smutted. None of the examples were subjected to the anodizing step but all were sealed by immersing in a chromium potassium sulfate solution for 10 minutes at room temperature. The percent TR, percent DR and percent specularity for each example is reported in the table:

| Example No. | Colloid | Percent | | |
|---|---|---|---|---|
| | | TR | DR | Specularity |
| 26 | .2% Gelatin A | 92.2 | 2.5 | 96.3 |
| 27 | .2% Gelatin A | 89.6 | 3.0 | 95.6 |
| 28 | .4% Gelatin A | 91.5 | 2.5 | 97.4 |
| 29 | .4% Gelatin A | 90.4 | 4.0 | 95.6 |
| 30 | .8% Gelatin A | 91.6 | 3.2 | 96.5 |
| 31 | .4% Gelatin A | 91.3 | 6.0 | 93.5 |
| 32 | .2% Gelatin B | 91.4 | 1.8 | 98.1 |
| 33 | .2% Gelatin B | 88.1 | 4.0 | 95.5 |
| 34 | .8% Gelatin A | 91.2 | 1.3 | 98.6 |
| 35 | .4% Gelatin B | 87.0 | 5.2 | 94.2 |
| 36 | .5% Gelatin B | 91.4 | 1.7 | 98.1 |
| 37 | .5% Gelatin B | 87.4 | 5.2 | 94.0 | the above results show that de-smutting improves the percent TR, percent DR and percent specularity, as would be expected. The concentration of colloid in the electrobrightening bath does not appear to be critical so long as the bath remains liquid and is not gelled by the colloid.

EXAMPLES 38–55

A series of examples were run using a variety of different colloids. In Example 40, No. 13 aluminum reflector sheet was used while in the remaining examples, No. 22 aluminum reflector sheet was used. Examples 38, 41–46, 50, 51, 53 and 54 were cleaned in an alkaline bath. An aluminum mill sheet sample was sprayed with a 2% solution of the colloid identified in the table below and coupons were cut from each sample. Where indicated in the table, in some examples the coupon was precleaned in an alkaline cleaning bath before spraying. The 2% coating solution were often very viscous and had to be heated before they could be satisfactorily sprayed. The coupons were tested on a Beckman spectroreflectometer for both total and diffuse reflectance. Percent specularity was calculated and the results are given in the table below.

| Example No. | Colloid | Percent | | |
|---|---|---|---|---|
| | | TR | DR | Specularity |
| 38 | Sodium alginate (Protanal LF) | 86 | 3.5 | 96 |
| 39 | Gelatin B | 88 | 3.5 | 96 |
| 40 | Sodium polyacrylate (Acrysol G-110) | 74 | 8 | 89 |
| 41 | Gum arabic | 90 | 5 | 94.5 |
| 42 | Cellosize WP 300 | 87 | 3.5 | 95.5 |
| 43 | Carbopol 940 (carboxypoly methylene) | 88 | 4 | 95 |
| 44 | Sodium carrageenin (natural colloid) | 88 | 5 | 94.5 |
| 45 | Polyvinyl pyrollidone (PVPK90) | 88 | 5 | 94.5 |
| 46 | Cellosize WP 4400 | 87 | 3.5 | 95.5 |
| 47 | Acrysol G-110 | 86 | 3 | 96.5 |
| 48 | Polyvinyl ether (G Antrey AN 139) | 88 | 6 | 93 |
| 49 | PVPK90 | 86 | 5 | 94 |
| 50 | Gantrey AN 139 | 87 | 4.5 | 93.5 |
| 51 | Gelatin A | 88 | 4.5 | 95 |
| 52 | WP 300 Cellosize | 89 | 4.5 | 95 |
| 53 | Sodium polyacrylamide (Cygard RC-294) | 89 | 5 | 94.5 |
| 54 | Gelatin B | 89 | 5.5 | 94 |
| 55 | Gelatin A | 90 | 7 | 92 |

TYPICAL PROCEDURE, #13 ALLOY

As a result of experiments varying the conditions and concentration of solutions used in the present method, especially preferred processing conditions have been developed for both Gelatin A and Gelatin B for coating No. 13 aluminum alloy. These conditions involve a 5 minute electrobrightening step, a 2 minute anodizing step and a 10 minute phosphate seal. When using Gelatin A, .35% of Gelatin A is preferably included in the anodizing bath. When Gelatin B is used, its concentration is preferably about .1% in the anodizing bath. In each instance, the process normally results in a surface having about 87% to 89% total reflectively and about 1.5% to about 3.5% diffuse reflectivity.

TYPICAL PROCEDURE, #22 ALLOY

Where No. 22 aluminum is processed, the same procedure is used except that where Gelatin A is the additive, it is used in about .4% in the anodizing solution. Under such conditions, Gelatin A produces a total reflectivity of 87% to 89% and a diffuse reflectivity of about 2% to about 3% and comparable results are obtained with Gelatin B.

In order to compare the use of hydrophilic colloid in the solution, 36 No. 22 aluminum reflectant sheets were processed through the Anodizing Process. 12 of the sheets (Group 1) were processed in the absence of hydrophilic colloid in the anodizing solution, receiving a 10 minute anodic coating. 12 other sheets (Group 2) were processed using .35% Gelatin A in the anodizing solution and the other 12 sheets (Group 3) were processed using .1% Gelatin B in the anodizing bath during the 10 minute anodic coating. With each type of reflector, 3 fixtures were constructed and were then tested photometrically on a Moore Research goniometer using a 400 watt color improved lamp. The average efficiency for each group was as follows:

| Group No.: | Average percent efficiency |
|---|---|
| 1 | 68.4 |
| 2 | 71.6 |
| 3 | 69.5 |

For comparison purposes, three fixtures using an Alcoa Alzak anodized aluminum as the reflectors had an average efficiency of 68.6. Spectroreflectometer readings in the visible region were made for the three groups of reflectors and for the Alcoa Alzak reflectors before they were installed in their fixtures. The average of the readings for each group was as follows:

| Group No.: | Percent TR reflectometer readings |
|---|---|
| 1 | 85.2 |
| 2 | 87 |
| 3 | 85.7 |
| Alcoa Alzak | 85.5 |

Additional experimentation was carried out to determine whether the coatings applied by the present invention withstood temperatures normally encountered in high power light fixtures and whether the coating or its initial higher efficiency in a light fixture depreciated during use. Eight light fixtures of the type illustrated in FIG. 1 were obtained and the reflectors were removed and discarded. Reflector segments or strips were placed in the "B" groove in four of the fixtures and small 2" by 2" coupons of sample reflector materials were placed in various locations in each of the other four fixtures for testing on a Beckman spectroreflectometer. Of each set of four fixtures, two contained coupons made by the above anodizing process without hydrophilic coating, and two contained coupons made by the above Typical Procedure #13 Alloy, with .35% Gelatin A in the anodizing solution. The "no gelatin" coatings were about 5 to 10 times thicker than the "Gelatin A" coatings. One of each resulting pair of fixtures was installed on the plant roof and the other was installed inside the plant. Each fixture was aimed lens down at a 55° angle and was operated at 1500 watts with a clear lamp. All fixtures were tested photometrically, both before use and after either 350 hours use on the roof or 500 hours use inside the plant. The test results in terms of percent TR, percent DR and percent specularity are as follows:

FIXTURES ON THE ROOF

|  | Initial test, percent | | | Test after aging 350 hours, percent | | |
|---|---|---|---|---|---|---|
|  | TR | DR | Spec. | TR | DR | Spec. |
| Gelatin "A" additive, average test results | 87 | 2.5 | 97 | 87 | 2 | 97 |
| No gelatin, average test results | 85 | 3.5 | 96 | 84 | 4 | 95 |

FIXTURES IN THE PLANT

|  | | | | Test after aging 500 hours | | |
|---|---|---|---|---|---|---|
| Gelatin "A" additive, average test results | 87 | 2 | 97 | 87 | 2 | 97 |
| No gelatin, average test results | 85 | 3.5 | 96 | 85 | 4 | 95 |

Additional fixtures were constructed in order to determine if there is any deterioration of the reflector materials in other types of lamps. Four fixtures were obtained and in two the reflectors were replaced with Gelatin A coated reflectors prepared by the Typical Procedure #22 Alloy. The reflectors in the other fixtures were anodized in the same general manner but without any hydrophilic colloid and the coatings again were thicker than the Gelatin A coatings. All four fixtures were tested in the photometric laboratory with a calibrated color improved lamp and a clear mercury lamp and lumen output and efficiencies were calculated and recorded. One of each fixture type was placed in the plant and one of each type was placed on the roof and operated with a 1500 watt clear mercury lamp for 500 hours. The two fixtures in the plant were retested by photometric procedures after the 500 hours using the same calibrated lamps. The results were as follows:

|  | Average lumens with color improved lamp | Average lumens with clear lamp |
|---|---|---|
| Reflector type: | | |
| #22 with Gelatin A (#1 and #2) | 27,128 | 34,034 |
| #22 without gelatin (#3 and #4) | 25,814 | 32,751 |

|  | Peak candlepower color improved | Peak candlepower clear mercury |
|---|---|---|
| Results—Initial test: | | |
| Gelatin A, #1 | 30,500 | 95,000 |
| Gelatin A, #2 | 30,000 | 97,000 |
| No Gelatin, #3 | 28,500 | 88,000 |
| No Gelatin, #4 | 28,000 | 94,000 |
| Results—After 500 hours of aging: | | |
| Gelatin A, #1 | 31,000 | 94,000 |
| Without gelatin, #3 | 29,000 | 89,000 |

As a specific example of the especially preferred procedure of this invention for producing the especially preferred very hard finishes, an anodizing solution was prepared containing 15% sulfuric acid, .35% Gelatin A and .02% (100 grams/100 gallons) of potassium dichromate as hardening agent. Four aluminum reflector sheets (sheets W, X, Y, and Z) were processed 3 minutes in the alkaline cleaner at 155° F., followed by two one-minute tap water rinses, a 30-second dip in a dilute nitric acid bath again followed by two one-minute rinses, and then in the electrobrightening bath at a temperature of 78% F. for 5 minutes at a potential of 18 volts (starting current density of 160 amps per sq. ft. and ending current density of 70 amps). The sheets were rinsed in tap water for 30 seconds, desmutted in the smut remover at 150° F. for 2 minutes, anodized in the anodizing solution at 70° F. for 2 minutes with a starting potential of 5 volts (current density of 10 amps per sq. ft.) and an ending potential of 11 volts (current density of 30 amps per sq. ft.) and then rinsed.

The optimum anodizing process for this form of the invention is one involving about 5 minutes electrobrightening and 2 minutes anodizing with no subsequent seal.

The sheets were tested on a Beckman spectrophotometer for total and diffuse reflectance values in the visible region and had an average of 87 to 88% TR and 2 to 3% DR. The coating thicknesses averaged about .0375 mil. The coatings were much harder than those prepared without the tanning agent in the anodizing bath. The hardness was determined by the Stovall Hardness Test which involved imprinting a thumb print on the surface, spraying the surface with a solution of 50% Turco Glyst Concentrate (believed to be a mixture of degreasing solvents containing one or more ketones) and wiping the sprayed surface with a circular wiping motion with sufficient pressure to remove the thumb print. The sheet is then held at a 30° to 40° angle from horizontal under clear mercury light and observed for circular scratches. No scratches were observed on sheets W, X, Y and Z, although scratches appeared on all sheets tested which were anodized in a bath which did not contain tanning agent and some were badly scratched.

An extensive study was made of various procedures for producing anodized coatings on #22 aluminum reflector sheets for the purpose of determining the differences in results obtained with and without the hydrophilic colloid in the anodizing bath. Among the processes studied were the following:

Process A.—5 minutes in the electrobrightening bath followed by 5 minutes anodic coating in the anodizing bath at 14 volts DC, followed by a 10 minute seal in hot water (208° F.).

Process B.—5 minutes in the electrobrightening bath followed by 2 minutes anodic coating in the anodizing bath at 14 volts DC, followed by 10 minutes seal in a 2% chromium potassium sulphate solution.

Process C.—5 minutes in the electrobrightening bath followed by 2 minutes anodic coating in the anodizing bath at 11 volts DC with .5% Gelatin A added to the anodizing bath, followed by 10 minute seal in the chromium potassium sulphate solution.

Process D.—5 minutes in the electrobrightening bath followed by 2 minutes anodic coating in the anodizing bath at 11 volts DC with .1% Gelatin B added to the anodizing bath, followed by 10 minutes seal in the chromium potassium sulphate solution.

Process E.—5 minutes electrobrightening with .4% Gelatin B added to the electrobrightening bath, followed by 2 minutes anodic coating at 11 volts DC with .5% Gelatin A added to the anodizing bath, followed by a 10 minute seal in the chromium potassium sulphate solution.

Total and diffuse reflectance measurements were made on the #22 aluminum sheets anodized by the above processes using a Beckman DB–G spectrophotometer and a Texas Instrument Function/Riter No. 341 recorder. Samples were tested from wave length settings of 700 nm. to 200 nm. using a tungsten source for the visible region and hydrogen lamp for the ultraviolet region. All results are a percent of the reference samples, magnesium carbonate powder, pressed in a Bausch & Lomb press. The reflectance values were calculated using a Planimeter No. PL633. The scale was expanded for a higher degree of accuracy on all readings by using the Beckman scale expander.

The readings reported in the table below are average readings from a large number of anodized sheets prepared by the above 5 processes. Also, included in the table are average results obtained from testing commercially available sheets made by the Alcoa Type I Alzak process.

| Process | Percent | | | CCT, mils* |
| --- | --- | --- | --- | --- |
| | TR | DR | Specularity | |
| A | 85.2 | 3.4 | 96.0 | .2108 |
| B | 85.5 | 1.9 | 97.6 | .0448 |
| C | 87.6 | 1.7 | 98.1 | .0337 |
| D | 88.4 | 2.2 | 97.4 | .0264 |
| E | 87.7 | 2.3 | 97.3 | .0299 |
| Alzak | 86.1 | 5.8 | 93.3 | .1651 |

*Calculated coating thickness.

The test results indicate that the longer period of time in the anodizing solution step reduces the total reflectance and builds up a thicker coating on the reflector sheet. The shorter length of time produces a more specular reflector sheet but a thinner coating. The coatings produced in the presence of the gel (Processes C through E) were thin coatings with a longer life expectancy than coatings produced in the absence of hydrophilic colloid. The commercial Alzak coatings are much thicker than those prepared by Processes C through E and this is done on purpose to provide adequate life expectancy in a commercial product.

With respect to ingredients used in compositions prepared and described above, all percentages given are percentages by weight unless otherwise indicated.

What is claimed is:

1. The method of protecting a reflective surface while increasing its specularity, which method comprises coating said surface with a hydrophilic colloid while anodizing said surface and tanning the colloid.

2. The method of claim 1 wherein said surface is an aluminum surface.

3. The method of claim 1 wherein said tanning step comprises dissolving a tanning agent in the anodizing bath.

4. The method of claim 3 wherein said tanning agent is present in said bath in an amount between about .001 and about 10% by weight.

5. The method of claim 2 wherein the tanning step comprises anodizing the aluminum surface in an anodizing bath containing a water soluble tanning agent.

6. The method of claim 1 wherein said coating is by dipping the surface in a liquid solution of hydrophilic colloid at a concentration below the region of coacervation.

7. The method of claim 1 wherein said surface is aluminum and said coating step comprises depositing an aluminum colloidate on said surface.

8. The method of claim 1 wherein the tanning step comprises treating the coated surface with a tanning agent.

9. The method of claim 8 wherein said tanning agent is potassium dichromate.

10. The method of claim 8 wherein said tanning agent is selected from the class consisting of inorganic compounds having highly charged metal ions, amines, and their salts, urethane carboxyl compounds esters, alcohols and aldehydes.

11. The method of claim 1 wherein said colloid is a water soluble polar hydrophilic material having functional groups selected from the class consisting of carboxyl groups, amino groups, hydroxyl groups, ether groups, and alkali metal complexes.

12. The method of claim 11 wherein said colloid is a natural resin.

13. The method of claim 12 wherein said natural resin is gelatin.

14. The method of claim 12 wherein said resin is a gum.

15. The method of claim 11 wherein said colloid is a synthetic resin.

16. The method of claim 11 wherein said colloid is selected from the class consisting of water soluble natural gums, alkali carrageenin, alginates, gelatin, sodium salts of acrylic acid or acrylamide polymers, polyvinyl pyrollidone, polyvinyl ether, polyvinyl acetate, copolymers of vinyl acetate, methylcellulose, casein and derivatives, starch derivatives, cellulose acetate-phthalate and carboxypolymethylene.

17. An article of manufacture comprising a reflector having a metallic reflective surface and having an anodized coating on the reflective surface comprising a tanned hydrophilic colloid.

18. The article of claim 17 wherein said colloid is gelatin.

19. The article of claim 17 wherein said colloid is selected from the class consisting of water soluble natural and synthetic resins.

20. The article of claim 17 wherein said reflective surface is aluminum.

21. The article of claim 20 wherein the coated reflective surface has a specularity of at least about 94 percent.

22. The article of claim 20 wherein the coating is aluminum colloidate.

23. The article of claim 22 wherein said coating is aluminum gelatinate.

24. The article of claim 20 wherein said coating is co-electro-deposited colloid, aluminum oxide and tanning agent.

25. The article of claim 17 including a lamp fixture and means mounting said reflector in the fixture with the reflective surface faced for receiving and reflecting light from a lamp.

(References on following page)

References Cited

UNITED STATES PATENTS

| | | | |
|---|---|---|---|
| 1,946,152 | 2/1934 | Edwards | 204—35.1 |
| 2,466,971 | 4/1949 | Shawcross | 148—6.27 X |
| 2,476,957 | 7/1949 | Brenner et al. | 117—62.2 |

FOREIGN PATENTS

| | | | |
|---|---|---|---|
| 395,390 | 7/1933 | Great Britain | 204—58 |
| 396,743 | 8/1933 | Great Britain | 204—58 |

OTHER REFERENCES

Wernick, Metal Finishing, vol. 54, #8, August 1956, pp. 54–56.

Pullen, The Metal Industry, Sept. 18, 1936, pp. 293–295.

RALPH S. KENDALL, Primary Examiner

U.S. Cl. X.R.

117—35; 148—6.14; 204—35.1, 38.1, 58